United States Patent [19]
Gersch et al.

[11] 3,810,594
[45] May 14, 1974

[54] CARTRIDGE FOR MOTION PICTURE FILM

[75] Inventors: Josef Gersch, Unterhaching; Otto Wiedemann, Starnberg; Werner Kiessling, Unterhaching, all of Germany

[73] Assignee: Agfa-Gevaert Aktiengesellschaft, Leverkusen, Germany

[22] Filed: Sept. 1, 1972

[21] Appl. No.: 285,863

[30] Foreign Application Priority Data
Sept. 4, 1971   Germany.............................. 2144408

[52] U.S. Cl. .............................. 242/194, 352/78 R
[51] Int. Cl. ............................................ G03b 23/02
[58] Field of Search ......... 242/194, 197, 71.1, 71.2; 352/72, 78 R

[56] References Cited
UNITED STATES PATENTS
3,208,685   9/1965   Edward et al........................ 242/194
3,539,130   11/1970   Winkler et al...................... 242/194

Primary Examiner—George F. Mautz
Attorney, Agent, or Firm—Michael S. Striker

[57] ABSTRACT

A cartridge for 8-millimeter motion picture film has a housing wherein a partition extends between a first chamber for a supply of convoluted unexposed film and a second chamber for a takeup reel and has an opening through which the film passes toward the takeup reel. The supply of unexposed film loosely surrounds a core of the partition and the first chamber contains a rigid disk-shaped confining member having a relatively short outer flange which surrounds the outermost convolution of unexposed film and is surrounded by an extension of the partition. The coupling member can rotate with the supply of unexposed film and has a relatively long inner flange which extends between the core and the innermost convolution of unexposed film. The main portion of the confining member is located between the supply of unexposed film and an end wall of the housing and has coplanar radial spokes extending between the inner and outer flanges. These flanges prevent clockspringing of unexposed film in the first chamber.

9 Claims, 2 Drawing Figures

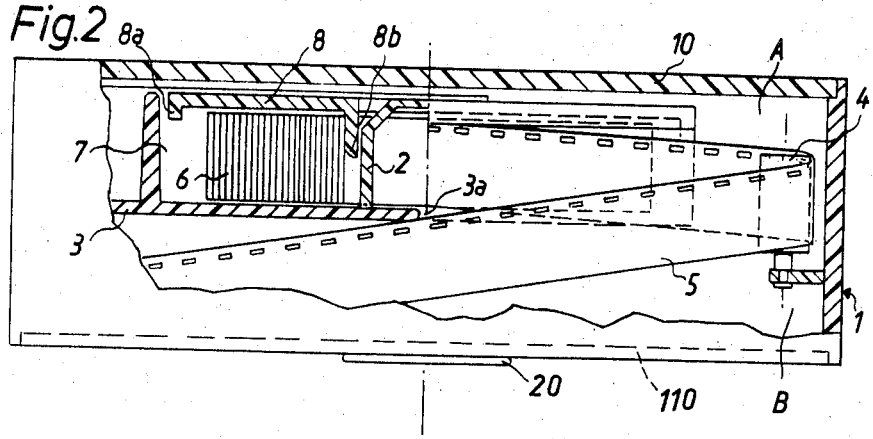
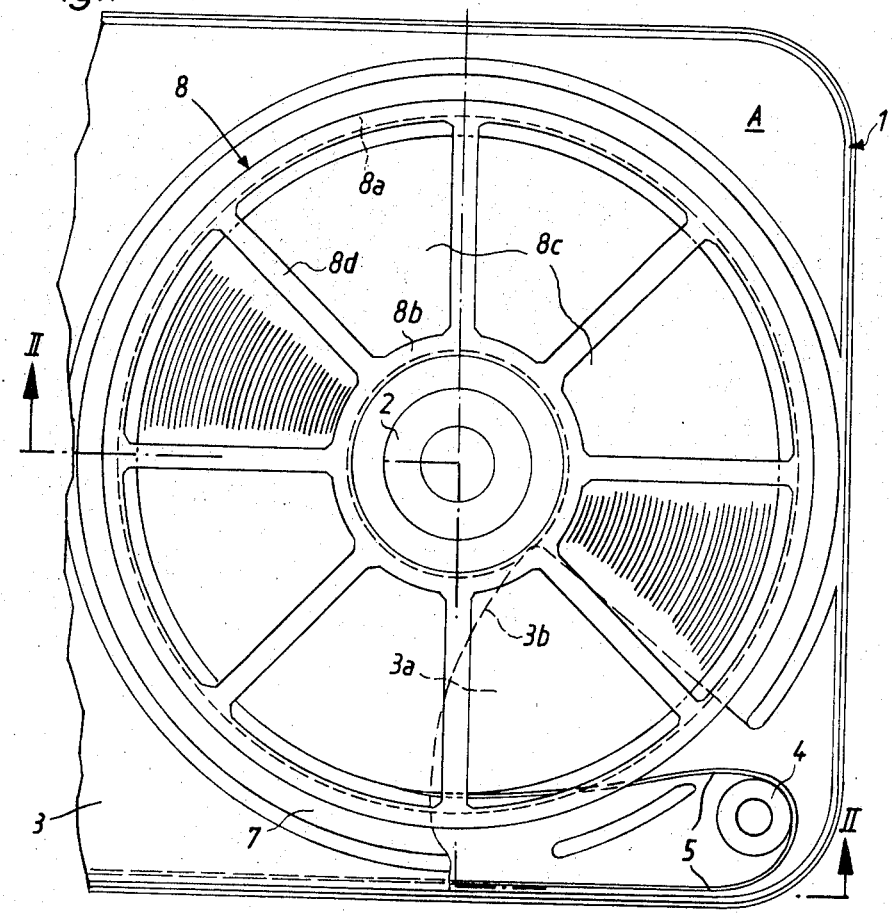

3,810,594

CARTRIDGE FOR MOTION PICTURE FILM

BACKGROUND OF THE INVENTION

The present invention relates to cartridges or cassettes for strip-shaped material, especially 8-millimeter motion picture film. More particularly, the invention relates to improvements in cartridges of the type wherein a supply of convoluted unexposed motion picture film is rotatable in a housing coaxially with a takeup reel. Still more particularly, the invention relates to improvements in cartridges which are provided with means for preventing unwinding or clockspringing of unexposed motion picture film.

It is already known to provide the housing of a cartridge for motion picture film with a partition which has an opening for the passage of film from a supply of unexposed film in a first chamber at one side of the partition toward the core of a takeup reel in a second chamber at the other side of the partition. As a rule, the supply of convoluted unexposed film is rotatable on a stationary core in the first chamber. The convoluted film is likely to unwind or clockspring so that its outermost convolution bears against an internal surface of the housing with attendant increase in friction and potential damage to the film.

Certain presently known cartridges are provided with a confining ring which surrounds the outermost convolution of unexposed film in the first chamber and can be tilted to move a portion thereof into the opening of the partition. Such ring is quite effective in preventing clockspringing; however, it cannot prevent the innermost convolution of unexposed film from frictionally engaging the core in the first chamber and such ring is further likely to frictionally engage the film portion which passes through the opening of the partition so that the film must be transported by exertion of a relatively large force. It is further known to install in the first chamber a disk-shaped confining member which is located between the supply of convoluted unexposed film and the partition and consists of elastomeric material so that it can be flexed by film into the opening of the partition with attendant increase of friction and the magnitude of forces which are necessary to draw unexposed film from the first chamber. The confining member is provided with a first flange which surrounds the outermost convolution and a second flange which extends between the core and the innermost convolution of unexposed film. The flanges can rotate with the supply of unexposed film in the first chamber.

SUMMARY OF THE INVENTION

An object of the invention is to provide a cartridge for motion picture film or other strip-shaped material with novel and improved means for preventing clockspringing of convoluted strip material.

Another object of the invention is to provide a confining member which can prevent an excessive increase of the diameter of the outermost convolution and/or an excessive decrease of the diameter of the innermost convolution of convoluted unexposed motion picture film in a cartridge for use in photographic apparatus.

A further object of the invention is to provide a confining member which need not be elastic and which is less likely to necessitate the exertion of a substantial pull in order to withdraw unexposed film from its chamber than heretofore known confining members.

An additional object of the invention is to provide a novel and improved confining member which can be used in at least some presently known types of cartridges or cassettes for motion picture film.

The invention resides in the provision of a cartridge or cassette for convoluted strip material, such as 8-millimeter motion picture film. The cartridge comprises a hollow housing having preferably parallel first and second end walls and a substantially plate-like partition disposed between and respectively defining with the first and second end walls a first and a second chamber. The partition has an opening through which the strip material can pass between the two chambers and the housing further comprises a core which may but need not be integral with the partition and extends into the first chamber to be loosely surrounded by a supply of convoluted strip material (e.g., unexposed motion picture film).

In accordance with a feature of the invention, the cartridge further comprises a preferably rigid and preferably disk-shaped confining member which is installed in the first chamber between the supply of strip material and the first end wall and can rotate with the supply. In order to prevent clock-springing of convoluted strip material, the confining member has a preferably flange-like portion which surrounds the outermost convolution and can be loosely surrounded by an annular extension of the partition. The confining member can further comprise a second flange-like portion which extends between the innermost convolution of strip material and the core in the first chamber.

The novel features which are considered as characteristic of the invention are set forth in particular in the appended claims. The improved cartridge itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary plan view of a cartridge which embodies the invention, with one end wall of the housing removed; and FIG. 2 is a partly elevational and partly sectional view as seen in the direction of arrows from the line II—II of FIG. 1.

DESCRIPTION OF THE PREFERRED EMBODIMENTS

The drawing illustrates a cartridge or cassette for motion picture film 5 which comprises a housing or casing 1 having two parallel end walls or covers 10, 110 and a substantially centrally located plate-like partition 3. The partition 3 defines with the end wall 10 a first film chamber A which receives a supply 6 of convoluted unexposed motion picture film 5. Furthermore, the partition 3 defines with the end wall 110 a second film chamber B which receives a takeup reel having a core 20 which can be driven by the motor of a motion picture camera when the cartridge is properly inserted into a compartment of the camera. The supply 6 loosely surrounds and is rotatable on a core 2 which is shown as being integral with the partition 3 and extends into the chamber A toward but short of the end wall 10. The partition 3 is provided with an opening or aperture 3a through which the film 5 can pass from the chamber A, around the periphery of a guide roll 4 which is rotatably mounted in the housing 1 at a point remote from the core 2, and toward the core 20 of the takeup reel. The housing 1 is provided with a customary gate (not shown) registering with those film frames which are being exposed to scene light when the photographic apparatus containing the improved cartridge is in use.

The core 20 is preferably coaxial with the core 2, i.e., the supply 6 of convoluted unexposed film 5 in the chamber A is at least substantially concentric with the supply of exposed film which is collected by the takeup reel in the chamber B.

The improved confining member 8 for the innermost and outermost convolutions of the supply 6 of film 5 in the chamber A includes a substantially disk-shaped main body portion which is located between the supply 6 and the end wall 10 and two confining portions or flanges 8a, 8b. The flange 8a is shorter than the flange 8b and surrounds the outermost convolution of the supply 6 so as to prevent clockspringing of unexposed film in the chamber A. The partition 3 comprises a substantially annular extension 7 which projects the chamber A and surrounds the flange 8a with at least some clearance. The inner flange 8b of the confining member 8 extends between the peripheral surface of the fixed core 2 and the innermost convolution of the supply 6 so that the innermost convolution cannot reduce its diameter and come into frictional engagement with the core 2. The confining member 8 can rotate with the supply 6 and has limited freedom of movement between the core 2 and the end wall 10.

It will be noted that, in contrast to the heretofore prevailing practice, the confining member 8 is installed between the supply 6 and the end wall 10 rather than between the supply and the partition 3. Consequently, the confining member 8 may consist of an at least substantially rigid material, preferably a moldable synthetic plastic material, because it need not be flexed into the opening 3a of the partition 3 when the film 5 is being convoluted onto the core 20 of the takeup reel. This renders it possible to transport the film 5 with the exertion of a lesser force. Since the outer flange 8a is relatively short, as considered in the axial direction of the core 2, this flange is still capable of properly confining the outermost convolution of the supply 6 but is less likely to generate substantial friction while the film 5 runs from the chamber A, through the opening 3a and into the chamber B to be collected on the driven core 20 of the takeup reel. The confining member 8 is guided by the core 2, end wall 10 and the extension 7 of the partition 3 so that it cannot be excessively tilted or otherwise displaced but is free to rotate when the core 20 is driven to draw the film 5 from the supply 6. Expansion of the outermost convolution of motion picture film 5 into engagement with the internal surface of the outer confining flange 8a presents no problems because the member 8 can rotate with the supply. The same applied for contraction of the innermost convolution of the supply 6 against the external surface of the inner confining flange 8b.

As shown in FIG. 1, the disk-shaped main body portion of the confining member 8 is provided with cutouts or windows 8c which define a plurality of preferably equidistant spokes 8d located in a common plane, extending substantially radially of the core 2, and connecting the outer flange 8a with the inner flange 8b. Such configuration of the confining member 8 results in savings in material and renders it possible to mass-produce the member 8 by resorting to a conventional injection molding procedure. The provision of windows 8c is further desirable because it brings about a reduction in the weight of the confining member 8 which is therefore less likely to damage or deface the film 5 and can be rotated with the convolutions of the supply 6 by the exertion of a relatively small force.

In accordance with a further feature of the invention, the axis of the guide roll 4 is at least substantially parallel with the axis of the core 2 and a portion of the opening 3a in the partition 3 is flanked by a concave surface 3b having its center of curvature located on the axis of the guide roll 4 or at least in the general region of the guide roll so that the length of that portion of film 5 which extends between the concave surface 3b and the periphery of the guide roll 4 is not dependent on the diameter of the supply 6. Thus, the distance which the film 5 covers from the supply 6 to the roll 4 is not overly dependent on the diameter of the supply and the tension of film 5 during transport toward the core 20 fluctuates very little or not at all.

An important advantage of the improved confining member 8 is that it need not be deformed by motion picture film while the film is being transported toward the takeup reel. Thus, the friction between motion picture film 5 and the confining member 8 is much less than the friction between motion picture film and an elastic confining member which is placed between the partition 3 and the supply of unexposed film. Furthermore, the manufacturer can produce the confining member 8 from a wide variety of metallic, plastic or other substances because the member 8 need not exhibit any elastic properties. Still further, eventual aging of the material of an elastic confining member can effect the operation of the camera because the magnitude of forces with which unexposed film must be drawn from its chamber will increase if the elasticity of the confining member decreases; this cannot happen with the confining member 8 because the latter need not undergo any deformation and is mounted in such a way that it cannot extend into the opening of the partition.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

We claim:

1. A cartridge for convoluted strip material, particularly motion picture film, comprising a hollow housing having first and second end walls and a partition disposed between and respectively defining with said first and second end walls a first and a second chamber, said partition having an opening through which the strip material can pass between said chambers and having a concave surface flanking a portion of said opening and having a center of curvature, and said housing further having a core located in said first chamber; a supply of convoluted strip material rotatably surrounding said core; a confining member disposed between said supply and said first end wall, said confining member being rotatable with said supply and having a portion at least partially surrounding said supply to prevent clock-springing of convoluted strip material in said first chamber; and a rotary guide arranged in said housing, remote from said core and located in the region of said center of curvature of said concave surface of said partition.

2. A cartridge is defined in claim 1, wherein said confining member further comprises a second portion located between said core and the innermost convolution of said supply.

3. A cartridge as defined in claim 2, wherein the length of one of said portions of said confining member, as considered in the axial direction of said core, exceeds the length of the other of said portions.

4. A cartridge as defined in claim 2, wherein said confining member further comprises at least substantially coplanar spokes extending substantially radially of said core between said first mentioned and second portions of said confining member.

5. A cartridge as defined in claim 2, wherein said core is rigid with said partition and said partition comprises an extension projecting into said first chamber and surrounding said first mentioned portion of said confining member.

6. A cartridge as defined in claim 1, wherein said confining member is at least substantially rigid.

7. A cartridge as defined in claim 1, wherein said confining member further comprises a second portion located between said core and the innermost convolution of said supply, said confining member consisting of a single piece of rigid synthetic plastic material.

8. A cartridge as defined in claim 7 wherein said end walls are parallel to each other and to said partition, and further comprising a takeup reel rotatably mounted in said second chamber to collect the strip material which is being withdrawn from said supply and passes through said opening.

9. A cartridge as defined in claim 1, wherein said partition comprises an extension surrounding said portion of said confining member with at least some clearance, said confining member having limited freedom of movement between said core and said first end wall.

* * * * *